US012639908B2

(12) United States Patent
Lester et al.

(10) Patent No.: US 12,639,908 B2
(45) Date of Patent: May 26, 2026

(54) METHODS AND SYSTEMS FOR SELECTIVELTY OUTPUTTING IMAGE DATA BASED ON MAP DATA

(71) Applicant: COMCAST CABLE COMMUNICATIONS, LLC, Philadelphia, PA (US)

(72) Inventors: Peter Lester, Sunnyvale, CA (US); Arun Ravisankar, Philadelphia, PA (US); Arpit Mathur, Philadelphia, PA (US); Scott Armstrong, Philadelphia, PA (US); Julianne Heinzmann, Philadelphia, PA (US); Resmi Vijayan, Philadelphia, PA (US); Andrew Posmontier, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 547 days.

(21) Appl. No.: 17/877,158

(22) Filed: Jul. 29, 2022

(65) Prior Publication Data

US 2024/0037888 A1 Feb. 1, 2024

(51) Int. Cl.
| | |
|---|---|
| *G06V 10/22* | (2022.01) |
| *G06T 7/12* | (2017.01) |
| *G06V 10/25* | (2022.01) |
| *G06V 20/40* | (2022.01) |
| *G06V 20/52* | (2022.01) |
| *G06V 20/70* | (2022.01) |
| *G08B 13/196* | (2006.01) |
| *H04N 7/18* | (2006.01) |

(52) U.S. Cl.
CPC ................ *G06V 10/22* (2022.01); *G06T 7/12* (2017.01); *G06V 10/25* (2022.01); *G06V 20/41* (2022.01); *G06V 20/52* (2022.01); *G06V 20/70* (2022.01); *G08B 13/196* (2013.01); *H04N 7/183* (2013.01); *G06T 2207/20021* (2013.01); *G06T 2207/30232* (2013.01)

(58) Field of Classification Search
None
See application file for complete search history.

(56) References Cited

U.S. PATENT DOCUMENTS

| | | | |
|---|---|---|---|
| 10,789,685 B2 | 9/2020 | Cutler et al. | |
| 2018/0365809 A1* | 12/2018 | Cutler | G06T 7/50 |
| 2019/0318171 A1* | 10/2019 | Wang | G06V 10/454 |

* cited by examiner

*Primary Examiner* — Lennin R Rodriguezgonzalez
(74) *Attorney, Agent, or Firm* — Ballard Spahr LLP

(57) ABSTRACT

A camera system may capture object activity with a field of view comprising one or more regions and identify and selectively output captured image data based on the one or more regions.

20 Claims, 13 Drawing Sheets

900

910
CAPTURE IMAGE DATA

920
DETERMINE A PLURALITY OF SECURITY SETTINGS

930
SEND THE IMAGE DATA

940
WITHHOLD IMAGE DATA ASSOCIATED WITH A SECOND REGION

1200

1210
RECEIVE IMAGE DATA

1220
RECEIVE MAP DATA

1230
ASSOCIATE A FEATURE WITH A BOUNDARY

1240
DETERMINE A FIRST DISPLAY PARAMETER AND A SECOND DISPLAY PARAMETER

1250
CAUSE THE IMAGE DATA TO BE DISPLAYED

METHODS AND SYSTEMS FOR SELECTIVELTY OUTPUTTING IMAGE DATA BASED ON MAP DATA

BACKGROUND

Many premises have security systems comprising cameras and associated systems configured to detecting object activity with a field of view and outputting image data associated with the object activity. These cameras are often placed in such a way that their field of view includes areas beyond the camera owner's property (e.g., a neighbor's property, public property, etc. . . . ). Capturing and outputting image data of private property may violate terms of service agreements and may even create legal liabilities (e.g., invasion of privacy) or responsibilities.

SUMMARY

It is to be understood that both the following general description and the following detailed description are explanatory only and are not restrictive. Methods and systems are described for determining object activity within a region of interest and selectively outputting image data. A camera system (e.g., a smart camera, a camera in communication with a computing device, etc.) may detect one or more objects in one or more regions of interest. The camera system may identify/detect regions within its field of view, objects within the regions, actions/motions associated with the objects, or the like. Regions (images of the regions, etc.) within field of view of the camera system may be tagged with region-labels that identify the regions, such as, "street," "sidewalk," "private walkway," "private driveway," "private lawn," "private porch," and the like. The system may selectively output image data based on the one or more labels.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, and together with the description, serve to explain the principles of the methods and systems.

DETAILED DESCRIPTION

Figure 1:
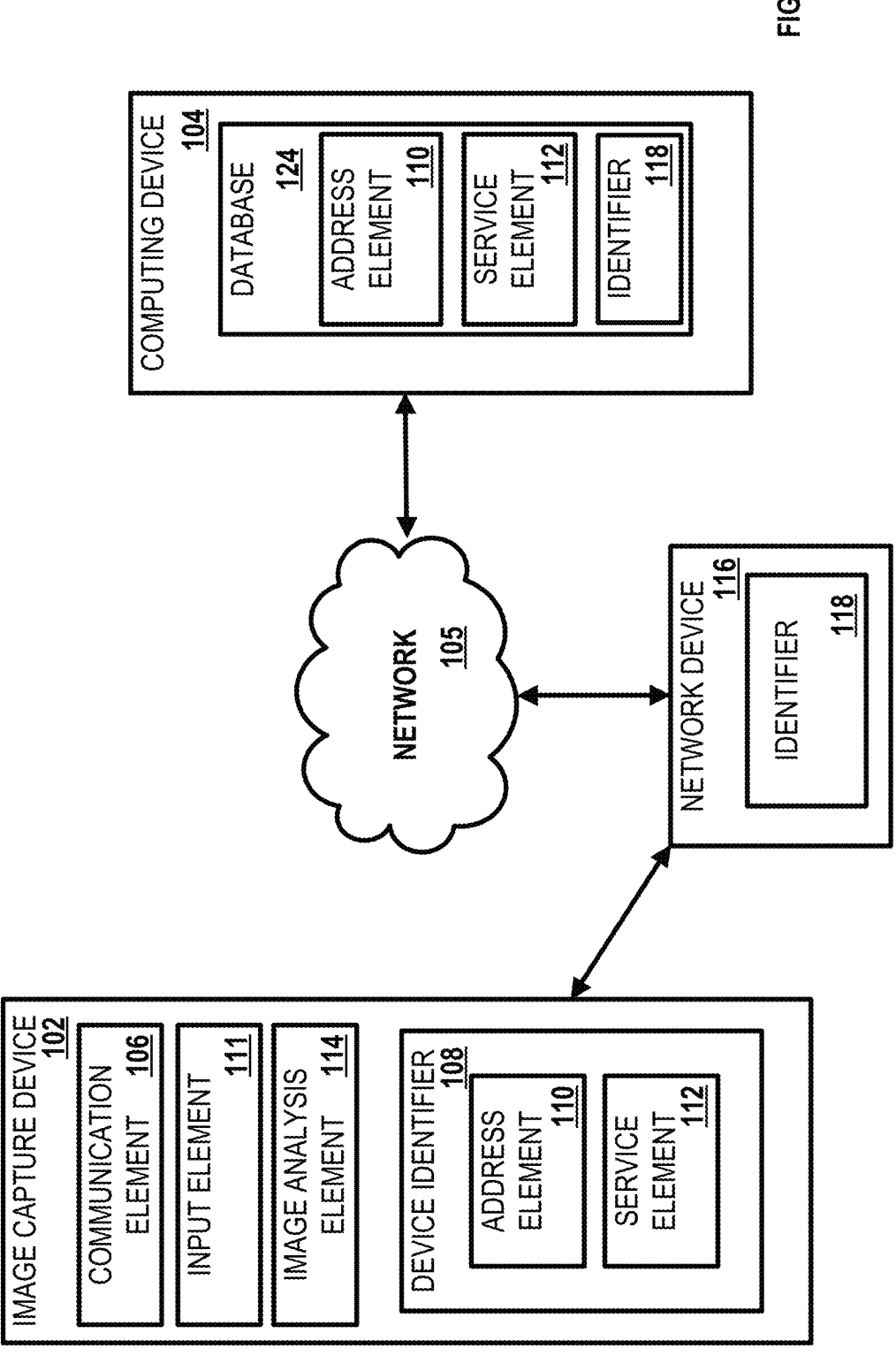
FIG. 1 shows an example system.

Before the present methods and systems are described, it is to be understood that the methods and systems are not limited to specific methods, specific components, or to particular implementations. It is also to be understood that the terminology used herein is for the purpose of describing particular features only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another range includes from the one particular value and/or to the other particular value. Similarly, when values are expressed as approximations, by use of the antecedent "about," it will be understood that the particular value forms another value. It will be further understood that the endpoints of each of the ranges are significant both in relation to the other endpoint, and independently of the other endpoint.

"Optional" or "optionally" means that the subsequently described event or circumstance may or may not occur, and that the description includes cases where said event or circumstance occurs and cases where it does not.

Throughout the description and claims of this specification, the word "comprise" and variations of the word, such as "comprising" and "comprises," means "including but not limited to," and is not intended to exclude other components, integers or steps. "Such as" is not used in a restrictive sense, but for explanatory purposes.

Components that may be used to perform the present methods and systems are described herein, and it is understood that when combinations, subsets, interactions, groups, etc. of these components are described that while specific reference of each various individual and collective combinations and permutation of these may not be explicitly described, each is specifically contemplated and described herein, for all methods and systems. This applies to all sections of this application including, but not limited to, steps in described methods. Thus, if there are a variety of additional steps that may be performed it is understood that each of these additional steps may be performed with any specific step or combination of steps of the described methods.

As will be appreciated by one skilled in the art, the methods and systems may be implemented using entirely hardware, entirely software, or a combination of software and hardware. Furthermore, the methods and systems may take the form of a computer program product on a computer-readable storage medium having computer-readable program instructions (e.g., computer software) encoded on the storage medium. More particularly, the present methods and systems may take the form of web-implemented computer software. Any suitable computer-readable storage medium may be utilized including hard disks, CD-ROMs, optical storage devices, or magnetic storage devices.

The methods and systems are described below with reference to block diagrams and flowchart illustrations of methods, systems, apparatuses and computer program products. It will be understood that each block of the block diagrams and flowcharts, and combinations of blocks in the block diagrams and flowcharts, respectively, may be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, may be implemented by special purpose hardware-based computer systems that perform the specified functions or steps, or combinations of special purpose hardware and computer instructions.

Note that in various cases described herein reference may be made to a given entity performing some action. It should be understood that this language may in some cases mean that a system (e.g., a computer) owned and/or controlled by the given entity is actually performing the action.

FIG. 1 shows an environment in which the present methods and systems may operate. The present disclosure is relevant to systems and methods for determining object activity within a region of interest. The network and system may be an image capture device 102 in communication with a computing device 104 such as a server. The computing device 104 may be disposed locally or remotely relative to the image capture device 102. The image capture device 102 and the computing device 104 may be in communication via a private and/or public network 105 such as the Internet or a local area network. Other forms of communications may be used such as wired and wireless telecommunication channels.

The image capture device 102 may be an electronic device such as a smart camera, a video recording and analysis device, a communications terminal, a computer, an output device (e.g., a display device), or other device capable of capturing images, video, and/or audio and communicating with the computing device 104. The image capture device 102 may be a communication element 106 for providing an interface to a user to interact with the image capture device 102 and/or the computing device 104. The communication element 106 may be any interface for presenting and/or receiving information to/from the user, such as a notification, confirmation, or the like associated with a region of interest (ROI), an object, or an action/motion within a field of view of the image capture device 102. An interface may be a communication interface such as a display screen, a touchscreen, an application interface, a web browser (e.g., Internet Explorer®, Mozilla Firefox®, Google Chrome®, Safari®, or the like). Other software, hardware, and/or interfaces may be used to provide communication between the user and one or more of the image capture device 102 and the computing device 104. The communication element 106 may request or query various files from a local source and/or a remote source. The communication element 106 may send data to a local or remote device such as the computing device 104.

The image capture device 102 may be associated with a device identifier 108. The device identifier 108 may be any identifier, token, character, string, or the like, for differentiating one image capture device (e.g., image capture device 102) from another image capture device. The device identifier 108 may identify an image capture device as belonging to a particular class of image capture devices. The device identifier 108 may be information relating to an image capture device such as a manufacturer, a model or type of device, a service provider associated with the image capture device 102, a state of the image capture device 102, a locator, and/or a label or classifier. Other information may be represented by the device identifier 108.

The device identifier 108 may be an address element 110 and a service element 112. The address element 110 may be or provide an internet protocol address, a network address, a media access control (MAC) address, an Internet address, or the like. The address element 110 may be relied upon to establish a communication session between the image capture device 102 and the computing device 104 or other devices and/or networks. The address element 110 may be used as an identifier or locator of the image capture device 102. The address element 110 may be persistent for a particular network.

The service element 112 may be an identification of a service provider associated with the image capture device 102 and/or with the class of image capture device 102. The class of the user device 102 may be related to a type of device, capability of device, type of service being provided, and/or a level of service (e.g., business class, service tier, service package, etc.). The service element 112 may be information relating to or provided by a communication service provider (e.g., Internet service provider) that is providing or enabling data flow such as communication services to the image capture device 102. The service element 112 may be information relating to a preferred service provider for one or more particular services relating to the image capture device 102. The address element 110 may be used to identify or retrieve data from the service element 112, or vice versa. One or more of the address element 110 and the service element 112 may be stored remotely from the image capture device 102 and retrieved by one or more devices such as the image capture device 102 and the computing device 104. Other information may be represented by the service element 112.

The computing device 104 may be a server for communicating with the image capture device 102. The computing device 104 may communicate with the user device 102 for providing data and/or services. The computing device 104 may provide services such as object activity and region detection services. The computing device 104 may allow the image capture device 102 to interact with remote resources such as data, devices, and files.

The computing device 104 may manage the communication between the image capture device 102 and a database 124 for sending and receiving data therebetween. The database 124 may store a plurality of files (e.g., regions of interest, motion indication parameters, etc.), object and/or action/motion detection algorithms, or any other information. The image capture device 102 may request and/or retrieve a file from the database 124. The database 124 may store information relating to the image capture device 102 such as the address element 110, the service element 112, regions of interest, motion indication parameters, and the like. The computing device 104 may obtain the device identifier 108 from the image capture device 102 and retrieve information from the database 124 such as the address element 110 and/or the service elements 112. The computing device 104 may obtain the address element 110 from the image capture device 102 and may retrieve the service element 112 from the database 124, or vice versa. The computing device 104 may obtain the regions of interest, motion indication parameters, object and/or action/motion detection algorithms, or the like from the image capture device 102 and retrieve/store information from the database 124, or vice versa. Any information may be stored in and retrieved from the database 124. The database 124 may be disposed remotely from the computing device 104 and accessed via direct or indirect connection. The database 124 may be integrated with the computing system 104 or some other device or system.

A network device 116 may be in communication with a network such as network 105. One or more of the network devices 116 may facilitate the connection of a device, such as image capture device 102, to the network 105. The network device 116 may be configured as a wireless access point (WAP). The network device 116 may be configured to allow one or more wireless devices to connect to a wired and/or wireless network using Wi-Fi, BLUETOOTH®, or any desired method or standard.

The network device 116 may be configured as a local area network (LAN). The network device 116 may be a dual band wireless access point. The network device 116 may be configured with a first service set identifier (SSID) (e.g., associated with a user network or private network) to function as a local network for a particular user or users. The network device 116 may be configured with a second service set identifier (SSID) (e.g., associated with a public/community network or a hidden network) to function as a secondary network or redundant network for connected communication devices.

The network device 116 may have an identifier 118. The identifier 118 may be or relate to an Internet Protocol (IP) Address IPV4/IPV6 or a media access control address (MAC address) or the like. The identifier 118 may be a unique identifier for facilitating communications on the physical network segment. There may be one or more network devices 116. Each of the network devices 116 may have a distinct identifier 118. An identifier (e.g., the identifier 118) may be associated with a physical location of the network device 116.

The image capture device 102 may have an input element 111. The input element 111 may be one or more cameras (e.g., video cameras) and/or microphones that may be used to capture one or more images (e.g., video, etc.) and/or audio of a scene within its field of view.

The image capture device 102 may have an image analysis element 114. The image analysis element 114 may analyze one or more images (e.g., video, frames of video, etc.) determined/captured by the image capture device 102 and determine a plurality of regions of a scene within a field of view of the image capture device 102 (e.g., the input element 111). Each region of the plurality of regions of the scene may be classified/designated as a region of interest (ROI). A plurality of ROIs associated with a scene may be used to generate a region segmentation map of the scene. The image analysis element 114 may use a region segmentation map as baseline and/or general information for predicting/determining a plurality of regions (e.g., a street, a porch, a lawn, etc.) of a new scene in a field of view of the image capture device 102.

The image analysis element 114 may use selected and/or user provided information/data associated with one or more scenes to automatically determine a plurality of regions of any scene within a field of view of the image capture device 102. The selected and/or user provided information/data may be provided to the image capture device 102 during a training/registration procedure. A user may provide general geometric, geographic, and/or topological information/data (e.g., user defined regions of interest, user defined geometric, geographic, and/or topological labels associated with one or more scenes such as "street, "porch, "lawn," etc.) to the image capture device 102. The system may receive map data. The map data may indicate the one or more regions and/or one or more boundaries associated with (e.g., separating) the one or more regions.

The communication element 106 may display a scene in the field of view of the image capture device 102 (e.g., the input element 111). The user may use the communication element 106 (e.g., an interface, a touchscreen, a keyboard, a mouse, etc.) to generate/provide the geometric, geographic, and/or topological information/data to the image analysis element 114. The user may use an interface to identify (e.g., draw, click, circle, etc.) regions of interests (ROIs) within a scene. The user may tag the ROIs with labels such as, "street," "sidewalk," "private walkway," "private driveway," "private lawn," "private porch," and the like. Similarly, the map data may indicate one or more labels associated with the one or more regions.

A region segmentation map may be generated, based on the ROIs. One or more region segmentation maps may be used to train the image analysis element 114 and/or any other camera system (e.g., a camera-based neural network, etc.) to automatically identify/detect regions of interest (ROIs) within a field of view. The image analysis element 114 may use the general geographic and/or topological information/data (e.g., one or more region segmentation maps, etc.) as template and/or general information to predict/determine regions and/or regions of interest (e.g., a street, a porch, a lawn, etc.) associated with any scene (e.g., a new scene) in a field of view of the image capture device 102.

The image analysis element 114 may determine an area within its field of view to be a region of interest (ROI) (e.g., a region of interest to a user) and/or areas within its field of view that are not regions of interest (e.g., non-ROIs). The image analysis element 114 may determine an area within its field of view to be a ROI or non-ROI based on long-term analysis of events occurring within its field of view. The image analysis element 114 may determine/detect a motion event occurring within an area within its field of view and/or a determined region of interest (ROI), such as a person walking towards a front door of a house within the field of view of the image capture device 102. The image analysis element 114 may analyze video captured by the input element 111 (e.g., video captured over a period of time, etc.) and determine whether a plurality of pixels associated with a frame of the video is different from a corresponding plurality of pixels associated with a previous frame of the video. The image analysis element 114 may tag the frame with a motion indication parameter based on the determination whether the plurality of pixels associated with the frame is different from a corresponding plurality of pixels associated with a previous frame of the video. If a change in the plurality of pixels associated with the frame is determined, the frame may be tagged with a motion indication parameter with a predefined value (e.g., 1) at the location in the frame where the change of pixel occurred. If it is determined that no pixels changed (e.g., the pixel and its corresponding pixel is the same, etc.), the frame may be tagged with a motion indication parameter with a different predefined value (e.g., 0). A plurality of frames associated with the video may be determined. The image analysis element 114 may determine and/or store a plurality of motion indication parameters.

The image analysis element 114 may determine an object in the image data. The object may be located in, for example, a first region of the one or more regions, but may overlap or otherwise be congruent with a second region of the one or more regions. For example, it may be determined that the object is a person standing in the owner's lawn but, due to the height of the person, the distance from the person to the camera, and the location and position of the camera, the upper torso of the person may overlap the neighbor's yard. The image analysis element 114 may determine one or more output parameters associated with the one or more regions and cause, based on the one or more output parameters, output of image data. For example, the first region (e.g., the owner's yard) may be associated with an unobscured output parameter (e.g., the first region should be presented clearly). However, the second region (e.g., the neighbor's yard) may be associated with an obscured output setting (e.g., blurred or blacked out). Meanwhile, the object (e.g., the person) may be associated with an unobscured output setting. Thus, the system may output clearly the first region and the object, but may be blur or blackout the second region.

The image analysis element 114 may be trained to continue or to cease outputting image data and/or sending a notification when an activity/motion event is detected in a ROI based on the one or more labels and/or based on user feedback. For example, the image analysis element may not output image data associated with a neighbor's property. The user may provide the feedback using an interface of a user device (e.g., a "Thumbs Up" button indicative of a notification being helpful; a "Thumbs Down" button indicative of a notification being unhelpful, and the like). The feedback may be sent by the user device to the analysis element 114. Based on the feedback provided from the user after viewing a notification, the camera system may continue or may cease providing notifications for the ROI associated with the notification. The camera system may continue providing notifications for the ROI associated with the notification when the feedback indicates the notification is helpful or desirable (e.g., an indication of a "Thumbs Up" in response to viewing the notification; an indication that the notification was viewed at least once; and the like). The camera system may cease providing notifications for the ROI associated with the notification when the feedback indicates the notification is not helpful or not desirable (e.g., an indication of a "Thumbs Down" in response to viewing the notification; an indication that the notification was not viewed; and the like).

The image capture device 102 may use the communication element 106 to notify the user of activity/motion occurring within a particular ROI. The notification may be sent to the user via a short range communication technique (e.g., BLUETOOTH®, near-field communication, infrared, etc.) or a long range communication technique (e.g., WIFI, cellular, satellite, Internet, etc.). The notification may be a text message, a notification/indication via an application, an email, a call, or any type of notification.

The camera system may identify/detect regions within its field of view, objects within the regions, actions/motions associated with the objects, or the like. The camera system may determine regions within its field of view and images of the regions may be tagged with region-labels that identify the regions. Images of the regions may be tagged with labels such as, "street," "sidewalk," "private walkway," "private driveway," "private lawn," "private porch," and the like. The camera system may determine the regions within its field of view based on user provided information. The user may use an interface in communication with and/or associated with the camera system that displays the camera system's field of view to identify (e.g., draw, click, circle, etc.) the regions. The camera system may determine the regions within its field of view by automatically identifying/detecting the regions based on map data or user inputs.

A region segmentation map may be generated, based on the identified/detected regions. One or more region segmentation maps and associated information may be used to train the camera system and/or any other camera system (e.g., a camera-based neural network, etc.) to automatically identify/detect regions of interest (ROIs) within a field of view. The camera system may automatically determine that a region within its field of view is a home/porch and whether an object moves towards the home/porch. The camera system may only be concerned (e.g., perform identification/detection, etc.) with region(s) within its field of view determined to be a particular region(s). The camera system may only be concerned with a region within its field of view determined to be a porch or regions connected to and/or associated with the porch, such as a lawn, a walkway, or the like. The camera system may only be concerned (e.g., perform identification/detection, etc.) with a particular region within its field of view to reduce analysis of unnecessary information (e.g., actions, motions, objects, etc.) of other regions within its field of view. The camera system may be configured to detect a particular object and/or action/motion occurring in the particular region within its field of view, such as a person walking towards the front door of a house. The camera system may be configured to ignore (e.g., not detect, etc.) a particular object and/or action/motion occurring in the particular region within its field of view, such as a person walking along a sidewalk. The camera system may use scene recognition to automatically identify regions, objects, and actions/motions occurring in a scene with in its field of view that may be a layout that is new to the camera system (e.g., the front yard of a location where the camera of the camera system is newly installed, etc.). The camera system (or any other camera system, etc.) may abstract away appearance variations between scenes within its field of view (e.g., variations in scenes caused by a change in a location of the camera system).

To abstract away appearance variations between scenes within its field of view, the camera system may use a layout-induced video representation (LIVR) method to encode a scene layout based on a region segmentation map determined from a previous scene in the camera system's field of view.

Figure 2A:
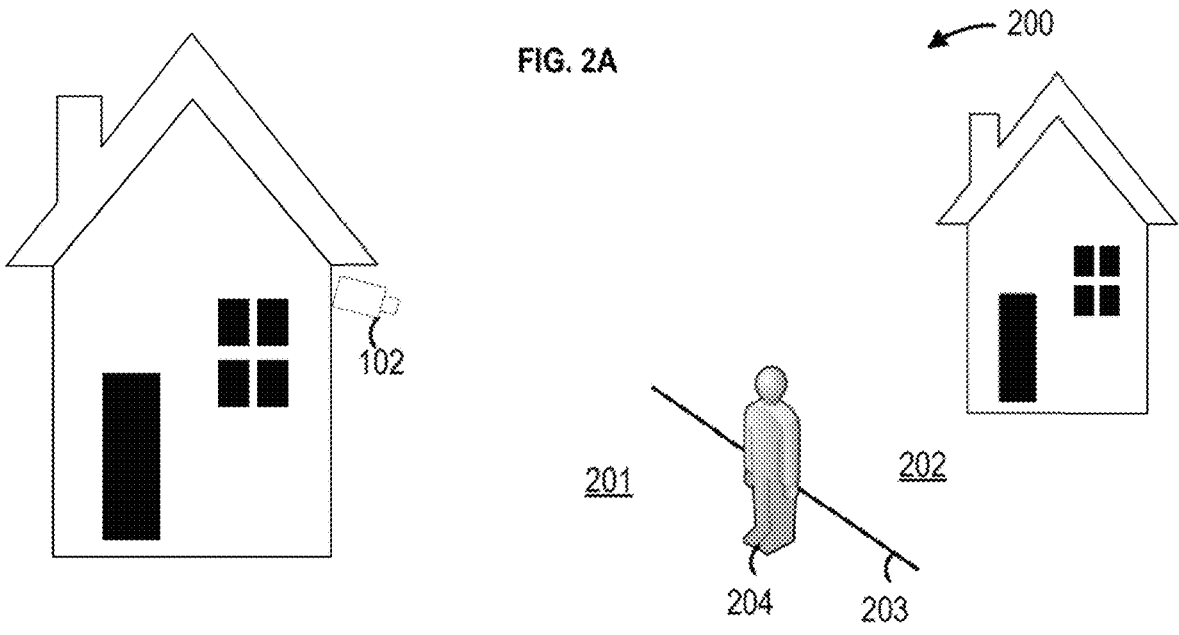
FIG. 2A shows an example system.

FIG. 2A shows an example scene 200. The scene 200 may comprise a first premises having an image capture device (e.g., the image capture device 102) configured to capture a field of view. The image capture device may be configured to capture or otherwise receive image data associated with the scene. The field of view of the image capture device 102 may comprise one or more regions 201 and 202, one or more boundaries 203, and one or more objects 204. The one or more objects 204 may be any object in the field of view of the image capture device. The field of view may be the area (e.g., bounds) of a real world space captured (e.g., recorded) by the image capture device. Objects and activities within the field of view may be referred to as a scene. For example, the object may be a person, car, tree, lawn chair, or any other object.

The computing device may determine one or more regions in the field of view of the image capture device. For example, the one or more regions may be determined based on map data, objected detection and recognition, facial detection and recognition, motion frequency patterns, semantic labeling techniques, user designated boundaries, combinations thereof, and the like. For example, the one or more boundaries may be indicated in map data received by the computing device. The map data may comprise GPS data (e.g., GPS coordinates) associated with one or more boundaries, one or more objects, one or more geographical (e.g., topological, geological, etc.) features, and/or relational distances therebetween. For example, the map data may indicate a boundary between a first property and a second property comprises one or more line segments between one or more GPS points (e.g., $lat_x$, $lon_x$ and $lat_y$, $lon_y$).

The computing device may determine the location of the image capture device, and orientation of the image capture device (e.g., a direction the device is pointing), and a position of the image capture device (e.g., where in space is the image capture device. For example, the computing device may determine the camera is at $lat_z$, $lon_z$, pointed due east, and 10 feet off the ground. This information may be determined based on one or more sensors associated with the image capture device, or may be input by a user upon installation of the image capture device. The computing device may determine a position of the image capture device relative to a boundary of the one or more boundaries. For example, the image capture device may determine that the camera is 10 feet off the ground, and the GPS coordinates of the image capture device are 20 feet from the nearest point of the first boundary and therefore (by Pythagorean theorem) the image capture device is 22.23 feet from the first boundary.

The computing device and/or the image capture device may determine a position of a first object of the one or more objects. For example, the image capture device may determine a distance to the object based on sensor data received from one or more sensors (e.g., a distance sensor such as SONAR, RADAR, LIDAR, time of flight, combinations thereof, or the like). Similarly, the image capture device may sends its orientation data, location data, and the distance-to-object data to the computing device and the computing device may determine the position of the object. Similarly, the image capture device and/or the computing device may determine the position (e.g., location) of a physical boundary such as a fence or wall. The one or more regions may be labeled with one or more labels. For example, the first region 201 may be labeled "owner's property" and the second region 202 may be labeled "neighbor's property." The object may be associated with a third label such as "person."

The image capture device and/or the computing device may determine the position of the object relative to the one or more labeled regions. For example, the image capture device may send position, location, orientation, and distance data associated with an object to the computing device. The computing device may be configured to determine, based on one or more of the position data, the location data, the orientation data, the distance data, and/or the map data, that a first object is located within (e.g., "rooted" to, or present on the surface of) a first region (e.g., the "owner's property" region).

Figure 2B:
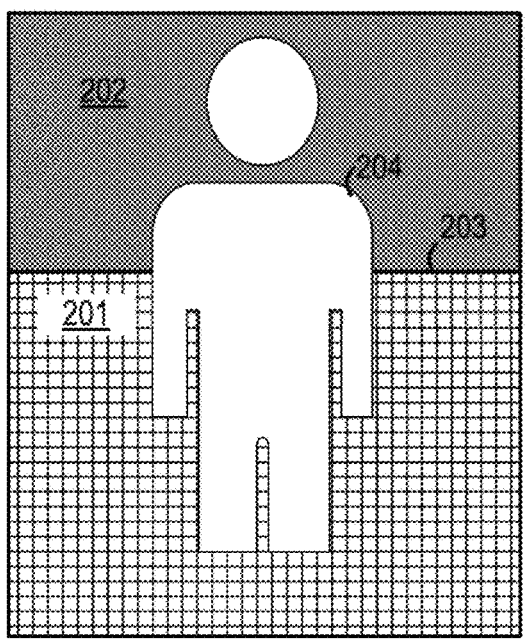
FIG. 2B shows an example image

FIG. 2B shows an example output as may be output by an output device. For example, an output device may be caused to output the image data according to the one or more output parameters. For example, the output device may be caused to output the object and the field of view according to (e.g., in compliance with) the one or more output parameters. For example, if the first region is labeled "owner's property," the first region may be displayed clearly. For example, if the second region is labeled "neighbor's property," the second region may be associated with a do not display or a blurry display parameter and that region may not be displayed or be displayed in a blurred fashion so as to obscure the scene in that region. The "person" label may be associated with a third display parameter such as "display entire object." Thus, the display device may display the entire object despite a portion of that object being congruent with the second region (e.g., blurred neighbor's property).

Figure 3:
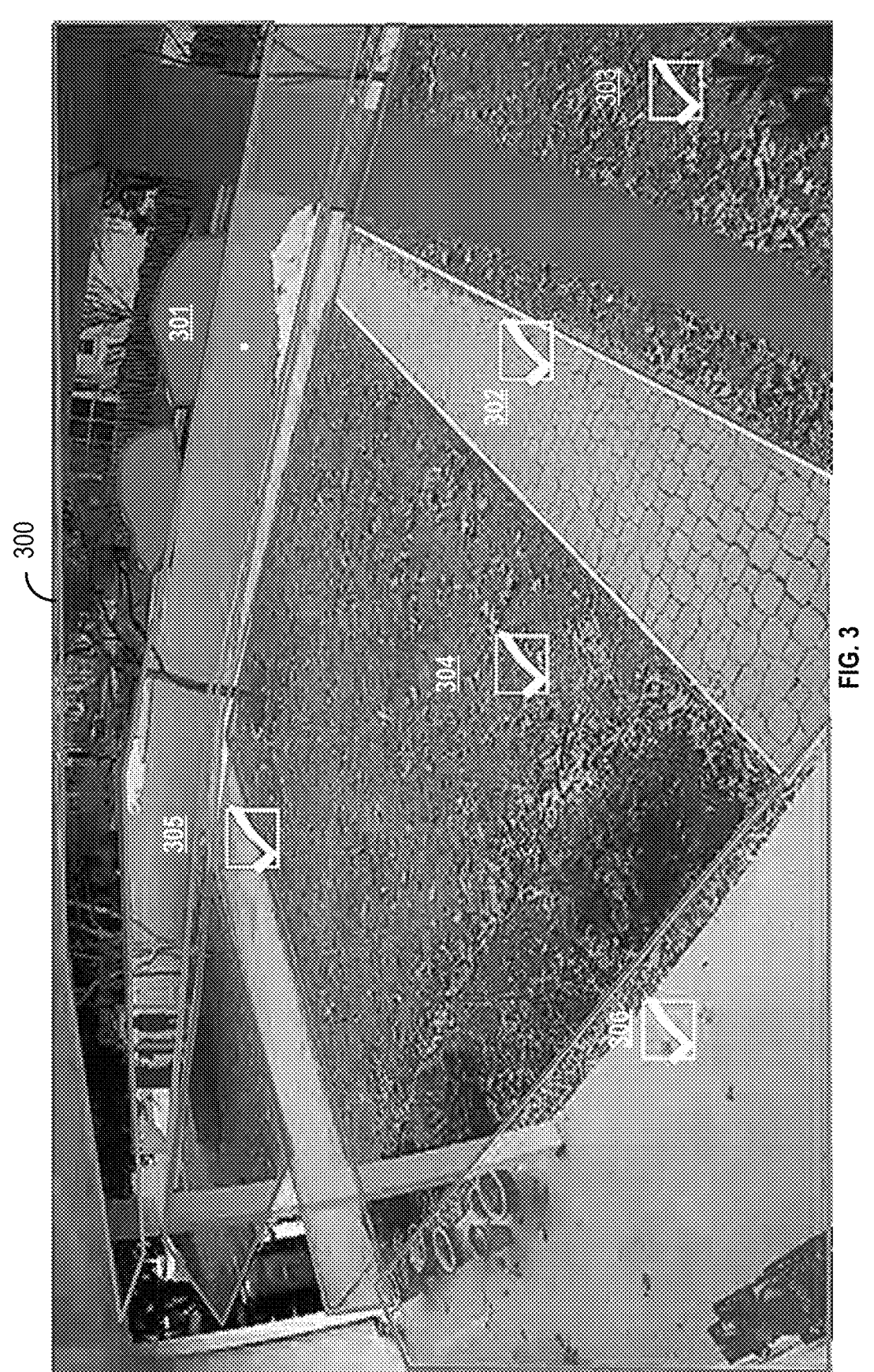
FIG. 3 shows an example image.

FIG. 3 shows a region segmentation map 300 used to train a camera system (e.g., the image capture device 102, a camera-based neural network, etc.) to automatically detect/ determine one or more regions in scenes captured in a field of view of the camera system. The region segmentation map 300 may be generated during a training/registration procedure associated with a camera system. The camera system may capture the image shown in the region segmentation map 300. A user may use the region segmentation map 300 to provide geographic and/or topological information/data to the camera system. An interface associated with the camera system (e.g., the communication element 106, etc.) may output the image shown in the region segmentation map 300 (e.g., a scene in a field of view of the camera system). The user may use an interface, a touchscreen, a keyboard, a mouse, and/or the like to identify geographic, geometric and/or topological information/data. The user may use an interface (e.g., the communication element 106, etc.) to generate/create the region segmentation map 300 by identifying/tagging regions of interests (ROIs) within the image of the scene.

The region segmentation map 300 may be tags/labels determined by the user such as, a road 301, a sidewalk 302, a lawn 303, a lawn 304, a driveway 305, or general area 306. One or more region segmentation maps may be used to train the camera system and/or any other camera system (e.g., a camera-based neural network, etc.) to automatically identify/detect regions of interest (ROIs) associated with a scene within its field of view. The camera system and/or any other camera system (e.g., a camera-based neural network, etc.) may use the general geographic, geometric and/or topological information/data (e.g., one or more region segmentation maps, etc.) as template and/or general information to predict/determine regions and/or regions of interest (e.g., a street, a porch, a lawn, etc.) associated with any scene (e.g., a new scene) in its field of view.

Figure 4:
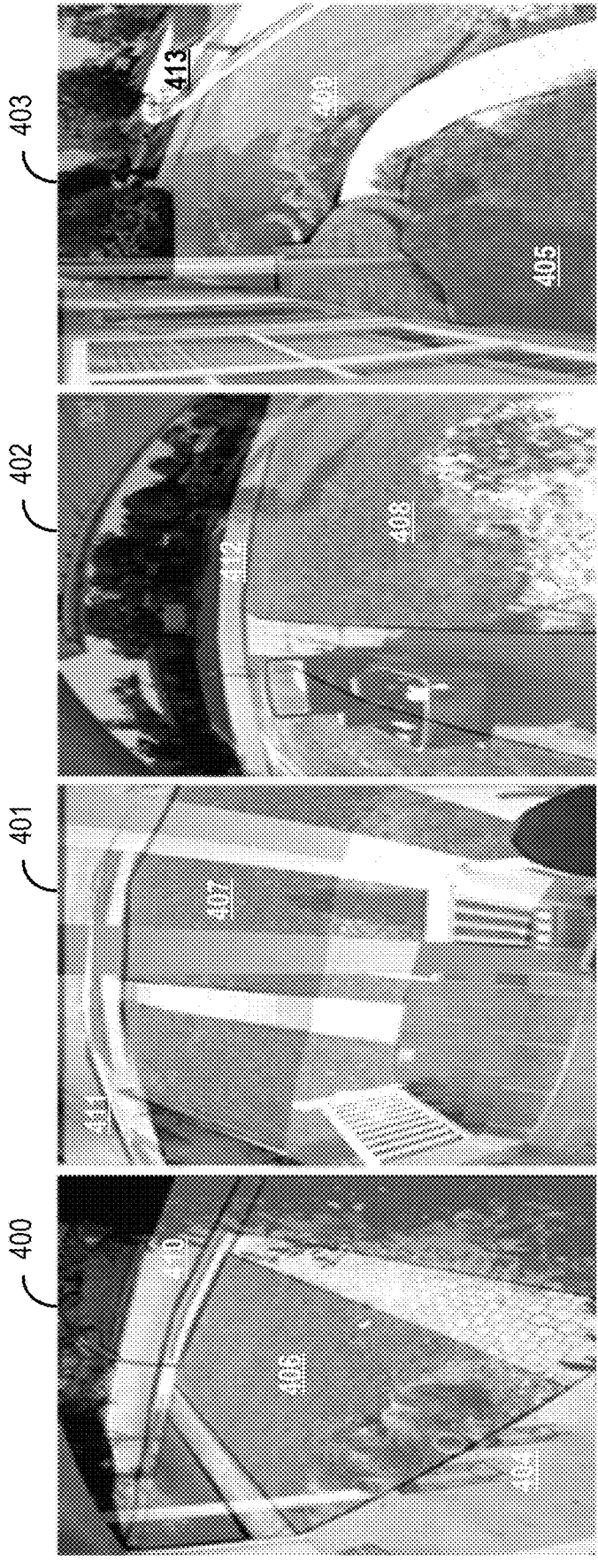
FIG. 4 shows example images.

FIG. 4 shows region segmentation maps 400, 401, 402, and 403. The region segmentation maps 400, 401, 402, and 403 may be automatically determined/predicted by a camera system (e.g., the image capture device 102, a camera-based neural network, etc.) based on a region segmentation map (e.g., the region segmentation map 300) used to train the camera system (e.g., the image capture device 102, a camera-based neural network, etc.) to automatically detect/ determine one or more regions in scenes captured in a field of view of the camera system.

The region segmentation maps 400, 401, 402, and 403 may represent geometry and topology of scene layouts, such as new scenes (e.g., scenes/images not previously captured by and/or introduced to the camera system, etc.) captured in the field of view of a camera system (e.g., the image capture device 102, etc.). A region map may be generated based on the identified/detected regions. The region map may be used to train a camera system to automatically identify/detect regions within a field of view. The camera system may automatically determine that a region within its field of view is a home/porch, street, or the like. The region segmentation maps 400 and 403 each show different homes/porches, 404 and 405 respectively, that have been automatically determined as such by the camera system. The region segmentation maps 400, 401, 402, and 403 each show different lawns, 406, 407, 408, and 409 respectively, that have been automatically determined as such by the camera system. The region segmentation maps 400, 401, 402, 403 each show different streets, 410, 411, 412, and 413 respectively, that have been automatically determined as such by the camera system.

Figure 5:
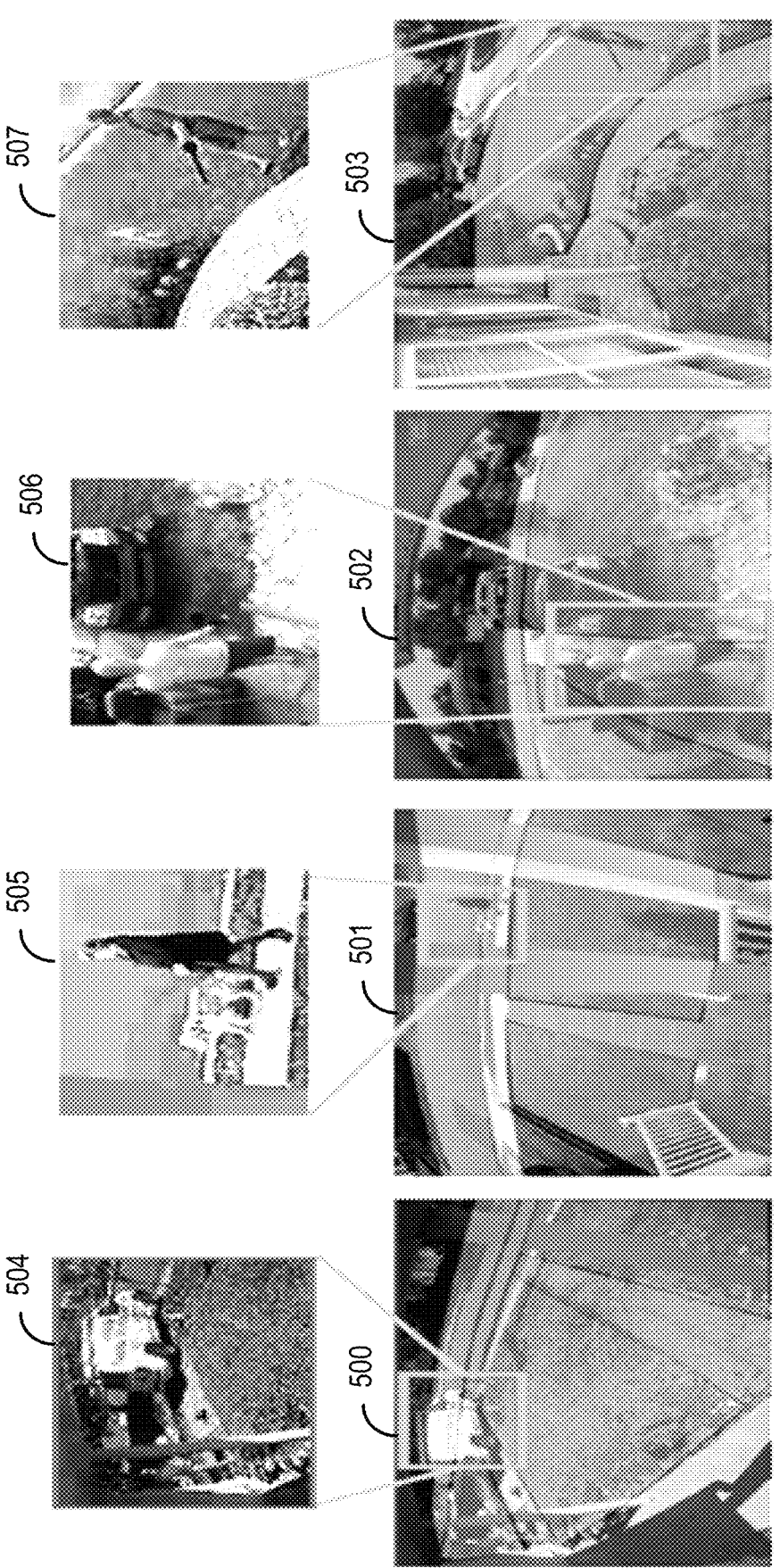
FIG. 5 shows example images.

FIG. 5 shows actions/motions occurring in a field of view of a camera system (e.g., the image capture device 102, etc.). The camera system may use one or more identification algorithms (e.g., a facial recognition algorithm, an object recognition algorithm, a landmark recognition algorithm, a motion recognition algorithm, etc.) to detect a particular object and/or action/motion occurring in a particular region within its field of view. The camera system may use a layout-induced video representation (LIVR) method to detect a particular object and/or action/motion occurring in a particular region within its field of view. The LIVR method is described in subsequent sections herein. Region segmentation maps 500, 501, 502, 503 each feature an action occurring within a field of view of a camera system. Region map 500 shows a vehicle in a driveway moving away from a home (504). Region map 501 shows a person and a pet moving along a sidewalk (505). Region map 502 shows a person in a driveway moving away from a home (506). Region map 503 shows a person moving across a lawn (507).

A camera-based neural network may be used for surveillance. The network must be able to identify actions occurring within a field of view of a camera. Such actions are generally associated with locations and directions. A camera system (e.g., the image capture device 102, etc.) and/or a camera-based neural network may be configured to detect/ identify certain actions occurring within a field of view of a camera and ignoring other actions. A user of a camera system may be interested in detecting (e.g., having an alert or notification generated, etc.) a person walking towards a front door of a house within the field of view of the camera system, and may be uninterested in detecting a person walking along the sidewalk that is also within the field of view. As such, the user's interest may be based on how objects captured in a field of view interact with the geometry and topology of a scene captured by the camera system. However, the layout of scenes captured in a field of view may vary significantly. Therefore a camera system (e.g., a camera-based neural network) must discriminately identify/ determine actions occurring with a field of view of an associated camera. The camera system (e.g., the image capture device 102, etc.) may use one or more identification algorithms (e.g., a facial recognition algorithm, an object recognition algorithm, a landmark recognition algorithm, a motion recognition algorithm, etc.) to detect a particular object and/or action/motion occurring in a particular region within its field of view. The camera system may use a layout-induced video representation (LIVR) method to detect a particular object and/or action/motion occurring in a particular region within its field of view. The camera system (e.g., a camera-based neural network) may be trained (e.g., trained during a training/registration procedure) to represent geometry and topology of scene layouts (e.g., scenes captured within a field of view of a camera) so that the camera system may use scenes determined during training to generalize/determine unseen layouts.

Figure 6:
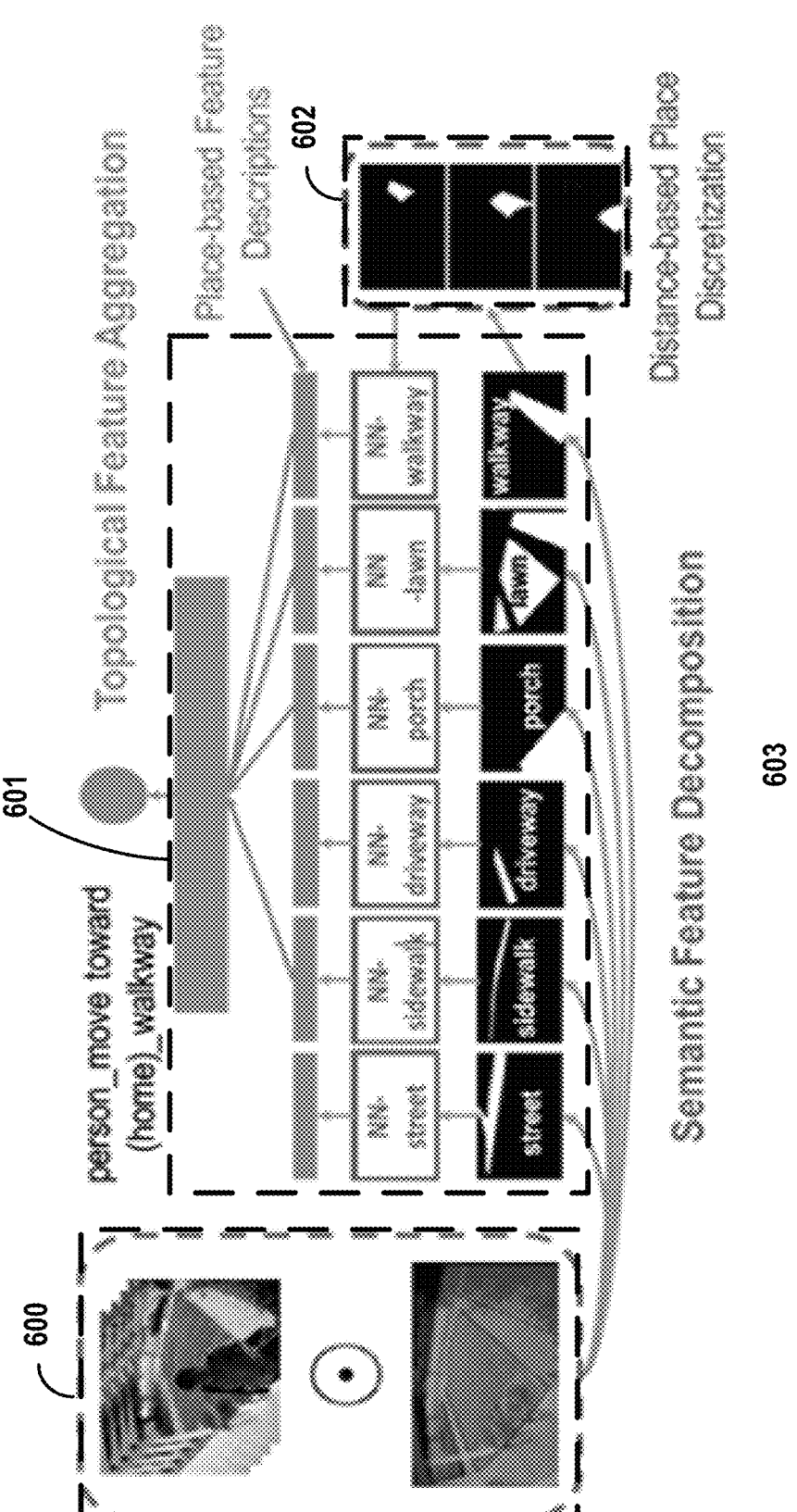
FIG. 6 shows an example method.

FIG. 6 is a graphical depiction (e.g., a layout-induced video representation (LIVR)) of a method that a camera system may use to detect a particular object and/or action/ motion occurring in a particular region within its field of view. The camera system may abstract away appearance variations between scenes within its field of view (e.g., variations in scenes caused by a change in a location of the camera system, etc.). To abstract away appearance variations between scenes within its field of view, the camera system may encode a scene layout based on a region segmentation map determined from a previous scene in the camera system's field of view. A layout-induced video representation (LIVR) may be one or more components such as a semantic component, a geographic component, a geometric component, and/or a topological component.

A semantic component 600 may be represented by characteristic functions (e.g., region-labels) of scene layouts (e.g., a set of bitmaps used for feature aggregation in convolutional layers of a neural network referred to as "places"). A geometric component 602 may be represented by a set of coarsely quantized distance transforms of each semantic place incorporated into the convolutional layers of a neural network (NN). A geographic component may be represented as an area of geography (e.g., a lawn, a hill, a field, a river, combinations thereof, and the like). A topological component upper part of 601 may be represented through the connection structure in a dynamically gated fully connected layer of the network—essentially aggregating representations from adjacent (more generally h-connected for h hops in the adjacency graph of the region segmentation map). The components 600, 601 and 602 require semantic feature decomposition as indicated at 603.

Bitmaps encoded with the semantic labels of places (e.g., "street," "sidewalk," "walkway," "driveway," "lawn," "porch," etc.) may be utilized to decompose video representations of scenes within a field of view of the camera system into different places (e.g., regions of interest, etc.) and train a camera-based neural network to learn/identify place-based feature descriptions (e.g., a street, a sidewalk, a walkway, a driveway, a lawn, a porch, etc.). Such decomposition encourages the camera-based neural network to learn features of generic place-based motion patterns that are independent of scene layouts. As part of the semantic feature decomposition, scene geometry may be encoded to model moving directions by discretizing a place into parts based on a quantized distance transform with regard to another place. The component 602 shows discretized bitmaps of walkway with regard to porch.

Figure 7:
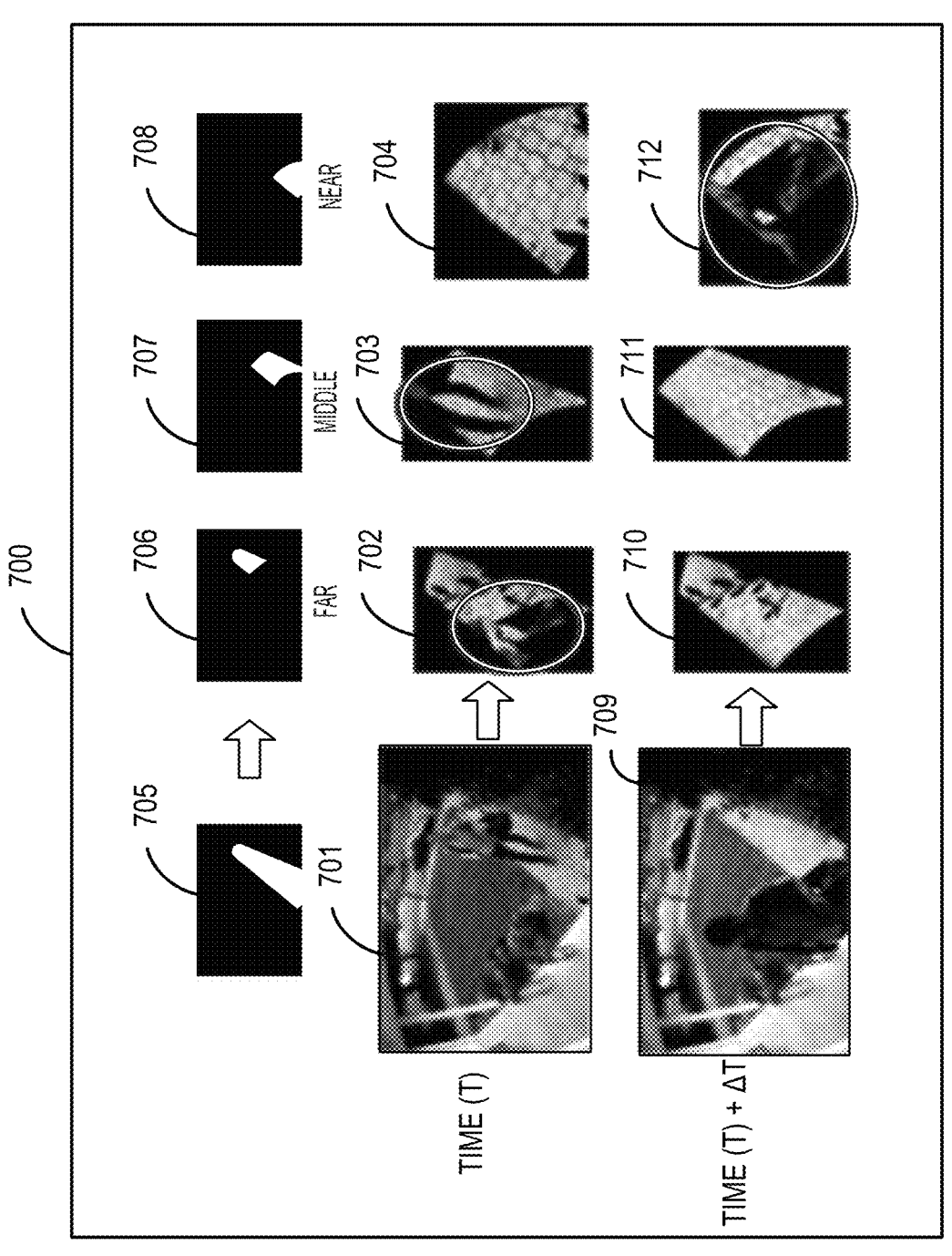
FIG. 7 shows example images.

FIG. 7 shows features decomposed by the discretized bitmaps shown in FIG. 6 at 602. 700 is a capture of moving agents in spatial-temporal order, which reveals the moving direction, and may be generalized to different scene layouts. 701 is an image captured by a camera system (e.g., the image computing device 102, etc.) that shows a scene where a person is walking on a walkway towards a house, occurring at time (t). Images (e.g., bitmaps) 702, 703, and 704 each show masked regions of the image 701 occurring at time (t). Image 705 is a bitmap (e.g., region segmentation map) where all objects are masked and only a walkway is revealed (e.g., an original walkway mask of 701). Discretized bitmaps 706, 707, and 708 show a far region of the walkway, a middle region of the walkway, and a near region of the walkway, respectively. 709 is an image captured by the camera system (e.g., the image computing device 102, etc.) that shows a scene where the person is still walking on the walkway towards the house at a point in time occurring after the image 701. Images (e.g., bitmaps) 710, 711, and 712 each show masked regions of the image 709 occurring at time (t+Δt).

The confidence of an action may be predicted by the camera system (e.g. camera-based neural network, etc.) by using place-based feature descriptions. For example, since the actions occurring in one place may also be projected onto adjacent places from a camera field of view, the confidence of an action may be predicted by dynamically aggregating features on the place which is associated with that action and its adjacent places. Topological feature aggregation may control the "on/off" of neuron connections from place-based feature descriptions to action nodes at both training and testing time based on scene topological connectivity.

Figure 8:
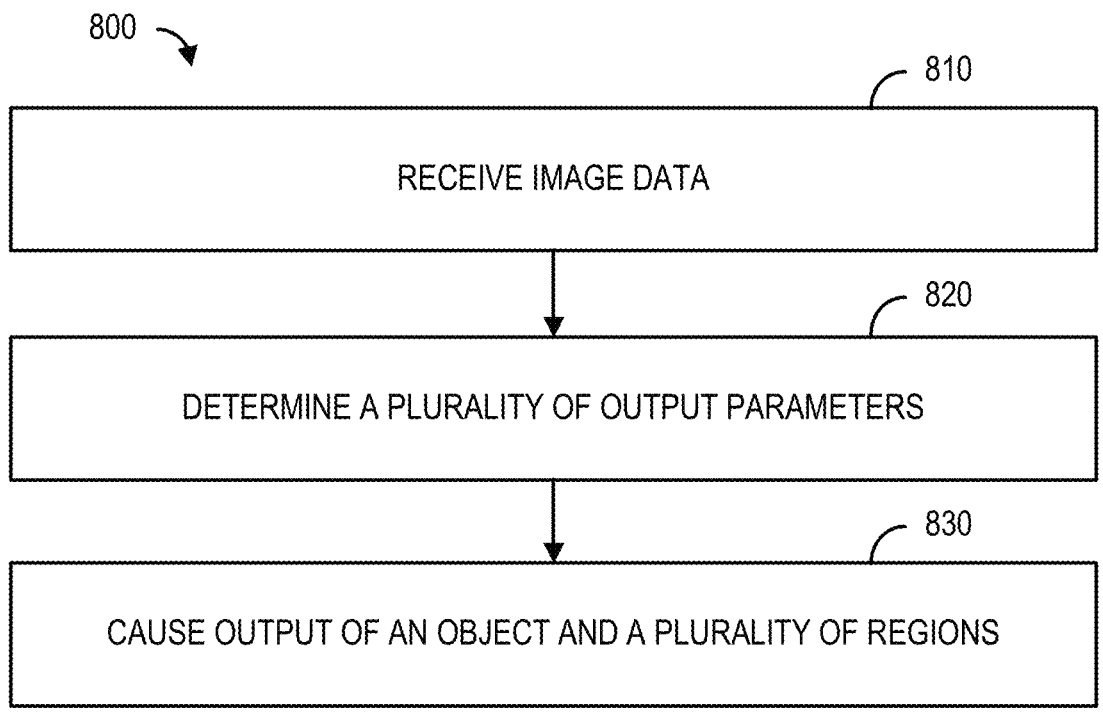
FIG. 8 shows a flowchart of an example method.

FIG. 8 is a flowchart of a method 800. The method 800 may be carried out on any one or more devices such as the devices disclosed herein. For example, the method 800 may be carried out on any one or more devices described herein such as those in FIG. 1. At 810, image data may be received. The image data may be received from an image capture device (e.g., the image capture device 102). For example, the image capture device may comprise, a camera. The camera may be a component of a security system or some other system configured to capture, send, receive, and process image data. For example, the camera system may capture video of a scene within its field of view (e.g., field of view of the camera, etc.). The image capture device may be configured to capture image data, receive image data, store image data, send image data, and/or otherwise process image data and related metadata.

The image data may comprise an object. The object may be any object in a field of view of the image capture device. The field of view may be the area (e.g., bounds) of a real world space captured (e.g., recorded) by the image capture device. Objects and activities within the field of view may be referred to as a scene. For example, the object may be a person, car, tree, lawn chair, or any other object. The image data may comprise a plurality of regions. For example, the scene within the field of view may be partitioned into different regions, such as a lawn, a porch, a street, and or the like. The regions (e.g., the plurality of regions of the scene) may be selected by a user. The regions (e.g., the plurality of regions of the scene) may be automatically determined by the camera system. A region may encompass another region (e.g., a second region is part of a first region). The region may also encompass only part of another region (e.g., a first region overlaps, at least partly, with a first region). Each region within the field of view may be processed individually (e.g., a notification may be triggered and provided to a user based on motion events detected in a first region, while motion events detected in a second region may be disabled from triggering a notification) or may be processed collectively (e.g., a notification may be triggered and provided to a user based on motion events detected in either, or both, of a first region or a second region). The one or more regions may be separated by a boundary. The boundary may be physical or not. For example, the one or more regions may be separated by a physical fence. On the other hand, the one or more regions may not be separated by a physical boundary, but a non-physical boundary such as a boundary between pieces of real property (e.g., zoning, metes and bounds of a piece of property. The one or more boundaries may be indicated in map data received by the system. The image analysis element 114 may determine, for example, based on its location, orientation, and distance to the one or more regions or one or more objects that the boundary is within the field of view.

The one or more regions may be labeled with one or more labels. For example, the first region may be labeled "owner's property" and the second region may be labeled "neighbor's property." The object may be associated with a third label such as "person."

At 820, one or more output parameters may be determined. The one or more output parameters may be associated with the one or more regions in the field of view. The one or more output parameters may be associated with the one or more labels. For example the one or more output parameters may comprise one or more output parameters. For example, a first output parameter and a second output parameter may be determined. For example, the first output parameter may be associated with the first region and the second output parameter may be associated with the second region. The one or more output parameters may be configured to alter the output of image data associated with the one or more regions. For example, the one or more output parameters may comprise one or more image processing actions (e.g., sending or not sending data) and/or one or more visual effects such as masking, blurring or otherwise altering the output of the image data. The one or more output parameters may be determined based on the one or more regions and/or the one or more boundaries.

At 830 an output device may be caused to output the image data according to the one or more output parameters. For example, an output device such as an output device may be caused to output the object and the field of view according to (e.g., in compliance with) the one or more output parameters. For example, if the first region is labeled "owner's property," the first region may be displayed clearly. For example, if the second region is labeled "neighbor's property," the second region may be associated with a do not output or a blurry display parameter and that region may not be displayed or be displayed in a blurred fashion so as to obscure the scene in that region. The "person" label may be associated with a third output parameter such as "display entire object." Thus, the output device may display the entire object despite a portion of that object being congruent with the second region (e.g., blurred neighbor's property).

A recognized object may be determined. For example, the recognized object may be determined based on object detection, object recognition, facial detection, and/or facial recognition. A security event may be determined. For example, the security event may be determined based on the recognized object.

Figure 9:
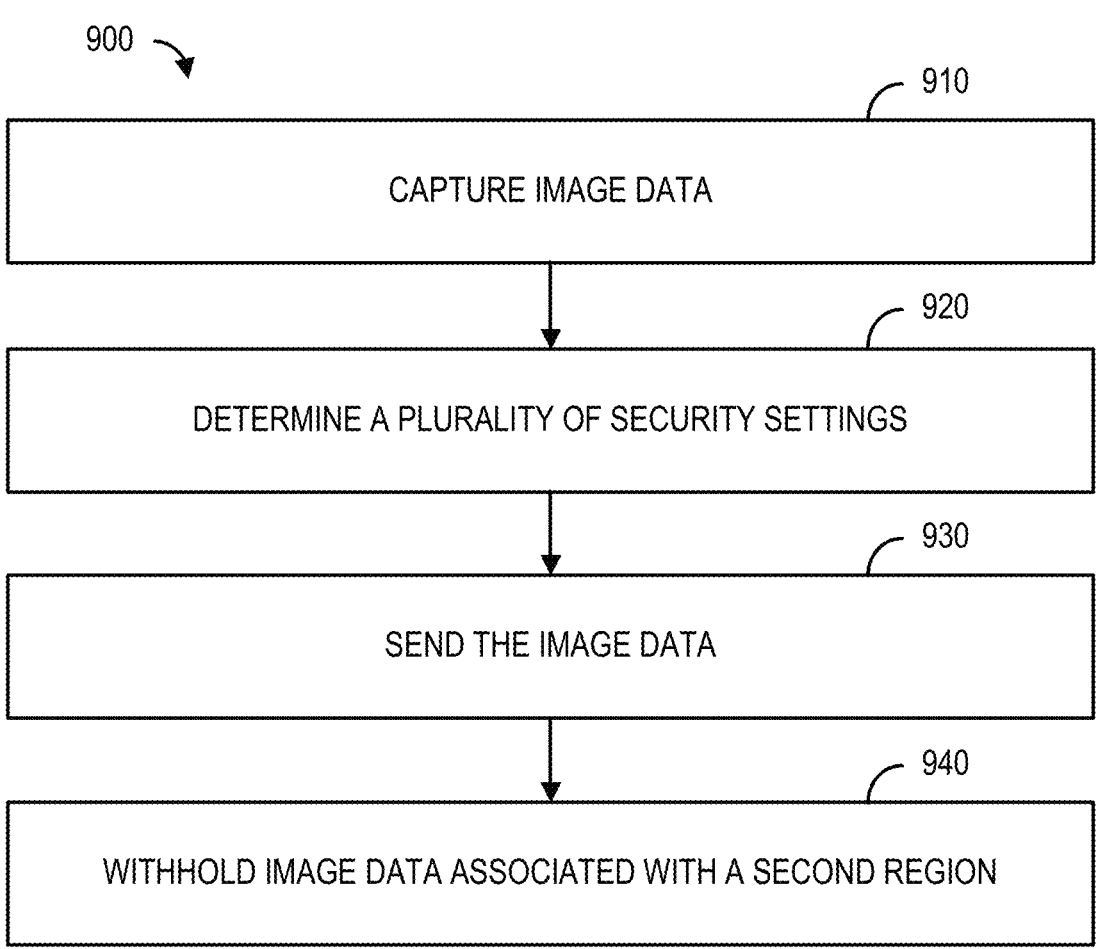
FIG. 9 shows a flowchart of an example method.

FIG. 9 is a flowchart of a method 900. The method 900 may be carried out on any one or more devices. For example, the method 900 may be carried out on any one or more devices described herein such as those in FIG. 1. At 910, image data may be captured. The image data may be captured by an image capture device (e.g., the image capture device 102). For example, the image capture device may comprise, a camera. The camera may be a component of a security system or some other system configured to capture, send, receive, and process image data. For example, the camera system may capture video of a scene within its field of view (e.g., field of view of the camera, etc.).

At 920, one or more security settings may be determined. The one or more security settings may comprise alert settings, alarms settings, output settings (e.g., display settings). For example, the one or more security settings may comprise output parameters such as clear output, blurry output, no output, combinations thereof, and the like. The one or more security settings may be associated with the one or more regions. For example, a first security setting of the one or more security settings may be associated with a first region of the one or more regions. For example, a second security setting may be associated with a second region of the one or more regions. For example, the one or more output parameters may comprise one or more image processing actions (e.g., sending or not sending data) and/or one or more visual effects such as masking, blurring or otherwise altering the output of the image data. The one or more output parameters may be determined based on the one or more regions and/or the one or more boundaries.

At 930, image data associated with the object and the first region of the field of view may be sent. For example, the image data may be sent from a computing device to an output device. The image data may be sent based on the one or more output parameters and/or one or more security settings.

At 940, image data associated with the second region in the field of view may be withheld (e.g., not sent to the output device). As such, a view would not see the second region output on the output device. The image data may be withheld based on the one or more output parameters and/or one or more security settings.

A recognized object may be determined. For example, the recognized object may be determined based on object detection, object recognition, facial detection, and/or facial recognition. A security event may be determined. For example, the security event may be determined based on the recognized object.

Figure 10:
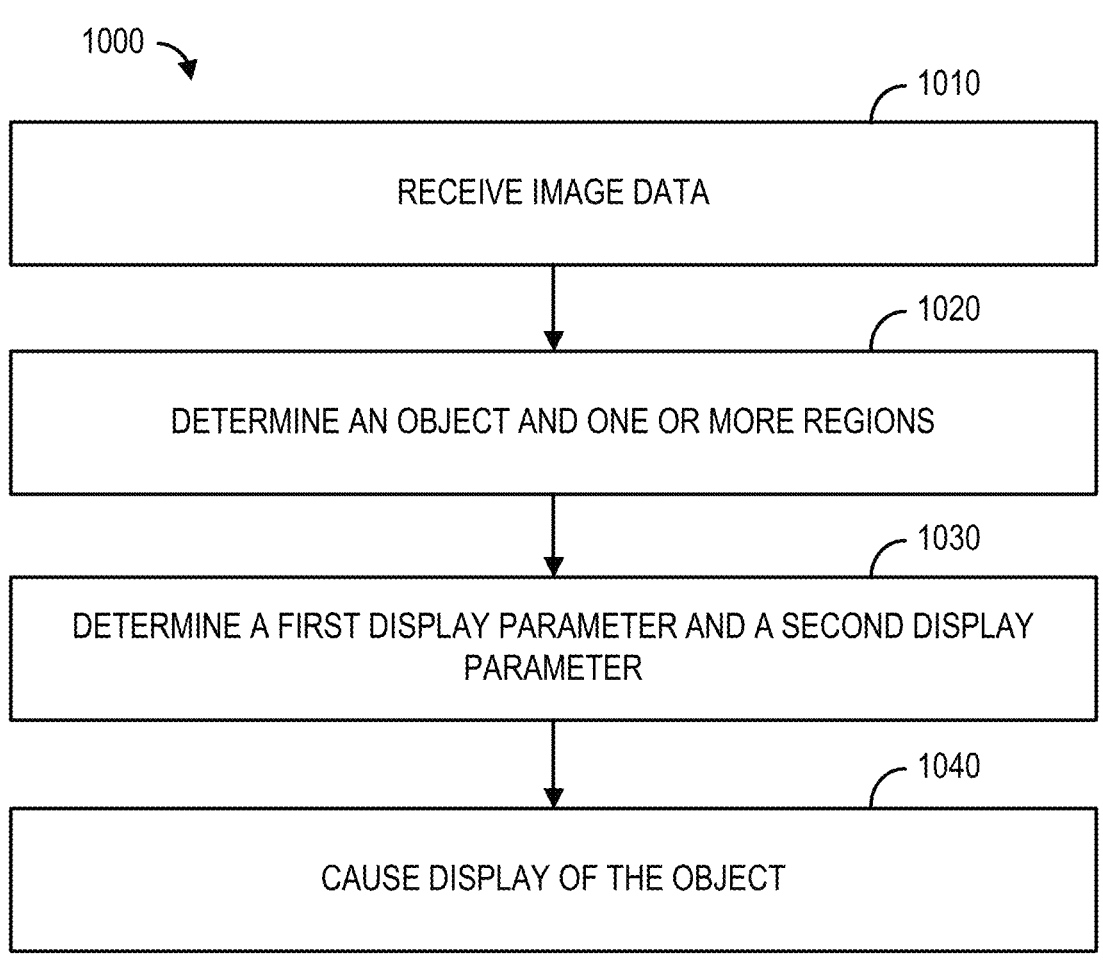
FIG. 10 shows a flowchart of an example method.

FIG. 10 is a flowchart of a method 1000. The method 1000 may be carried out on any one or more devices. For example, the method 1000 may be carried out on any one or more devices described herein such as those in FIG. 1. At 1010, image data may be received. The image data may be received, from an image capture device (e.g., the image capture device 102). For example, the image capture device may comprise, a camera. The camera may be a component of a security system or some other system configured to capture, send, receive, and process image data. For example, the camera system may capture video of a scene within its field of view (e.g., field of view of the camera, etc.).

The image data may comprise an object and one or more regions in a field of view. The object may be any object in a field of view of the image capture device. The field of view may be the area (e.g., bounds) of a real world space captured (e.g., recorded) by the image capture device. Objects and activities within the field of view may be referred to as a scene. For example, the object may be a person, car, tree, lawn chair, or any other object. For example, the scene within the field of view may be partitioned into different regions, such as a lawn, a porch, a street, and or the like. The regions (e.g., the plurality of regions of the scene) may be selected by a user. The regions (e.g., the plurality of regions of the scene) may be automatically determined by the camera system. A region may encompass another region (e.g., a second region is part of a first region). The region may also encompass only part of another region (e.g., a first region overlaps, at least partly, with a first region). Each region within the field of view may be processed individually (e.g., a notification may be triggered and provided to a user based on motion events detected in a first region, while motion events detected in a second region may be disabled from triggering a notification) or may be processed collectively (e.g., a notification may be triggered and provided to a user based on motion events detected in either, or both, of a first region or a second region).

The one or more regions may be separated by a boundary. The boundary may be physical or not. For example, the one or more regions may be separated by a physical fence. On the other hand, the one or more regions may not be separated by a physical boundary, but a non-physical boundary such as a boundary between pieces of real property (e.g., zoning, metes and bounds of a piece of property. The one or more boundaries may be indicated in map data received by the system. The image analysis element 114 may determine, for example, based on its location, orientation, and distance to the one or more regions or one or more objects that the boundary is within the field of view.

The one or more regions may be labeled with one or more labels. For example, the first region may be labeled "owner's property" and the second region may be labeled "neighbor's property." The object may be associated with a third label such as "person."

At 1020, one or more output parameters may be determined. The one or more output parameters may be determined based on a boundary. The boundary may separate one or more regions. The one or more output parameters may be associated with the one or more regions in the field of view. The one or more output parameters may be associated with the one or more labels. For example the one or more output parameters may comprise one or more output parameters. For example, a first output parameter and a second output parameter may be determined. For example, the first output parameter may be associated with the first region and the second output parameter may be associated with the second region. The one or more output parameters may be configured to alter the output of image data associated with the one or more regions. For example, the one or more output parameters may comprise one or more image processing actions (e.g., sending or not sending data) and/or one or more visual effects such as masking, blurring or otherwise altering the display of the image data. The one or more output parameters may be determined based on the one or more regions and/or the one or more boundaries.

At 1030, an output device may be caused to output the image data according to the one or more output parameters. For example, the output device may be caused to output the object and the field of view according to (e.g., in compliance with) the one or more output parameters. For example, if the first region is labeled "owner's property," the first region may be displayed clearly. For example, if the second region is labeled "neighbor's property," the second region may be associated with a do not output or a blurry display parameter and that region may not be displayed or be displayed in a blurred fashion so as to obscure the scene in that region. The "person" label may be associated with a third output parameter such as "display entire object." Thus, the output device may output the entire object despite a portion of that object being congruent with the second region (e.g., blurred neighbor's property).

A recognized object may be determined. For example, the recognized object may be determined based on object detection, object recognition, facial detection, and/or facial recognition. A security event may be determined. For example, the security event may be determined based on the recognized object.

Figure 11:
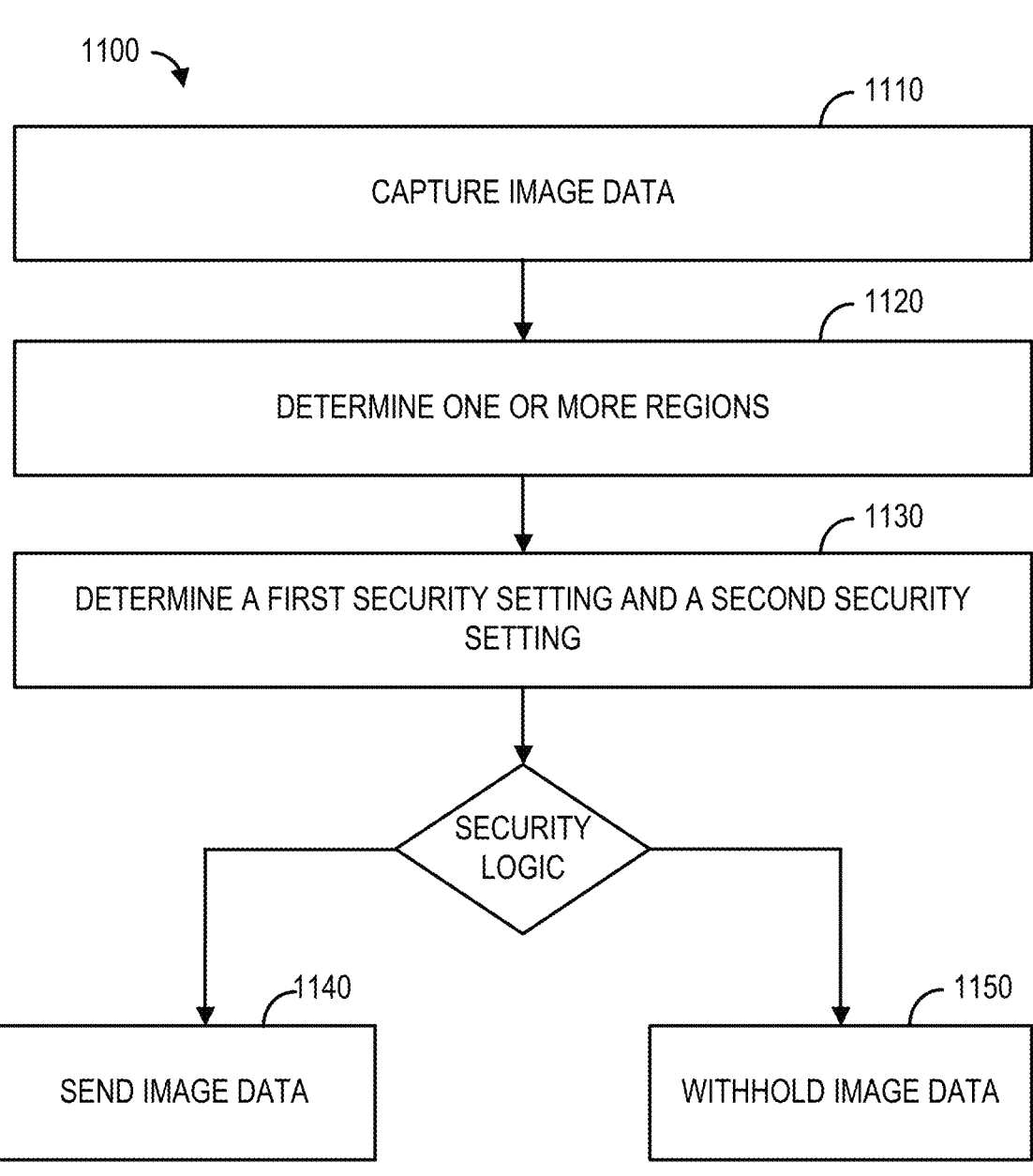
FIG. 11 shows a flowchart of an example method.

FIG. 11 is a flowchart of an example method 1100. The method 1100 may be carried out on any one or more devices. For example, the method 1100 may be carried out on any one or more devices described herein such as those in FIG. 1. At 1110, image data may be captured. The image data may comprise one or more objects in a field of view of an image capture device. For example, the image capture device may comprise, a camera. The camera may be a component of a security system or some other system configured to capture, send, receive, and process image data. For example, the camera system may capture video of a scene within its field of view (e.g., field of view of the camera, etc.). The image data may comprise a video feed captured by the image capture device and wherein the one or more boundaries comprise a property boundary.

At 1120 one or more regions in the field of view may be determined. For example, the scene within the field of view may be partitioned into different regions, such as a lawn, a porch, a street, and or the like. The regions (e.g., the plurality of regions of the scene) may be selected by a user. The regions (e.g., the plurality of regions of the scene) may be automatically determined by the camera system. The one or more regions may be labeled with one or more labels. For example, the first region may be labeled "owner's property" and the second region may be labeled "neighbor's property." The object may be associated with a third label such as "person." The one or more regions may be separated by one or more boundaries. The boundary may be physical or not. For example, the one or more regions may be separated by a physical fence. On the other hand, the one or more regions may not be separated by a physical boundary, but a non-physical boundary such as a boundary between pieces of real property (e.g., zoning, metes and bounds of a piece of property.

At 1130 one or more security settings may be determined. The one or more security settings may comprise alert settings, alarms settings, output settings (e.g., display settings). For example, the one or more security settings may comprise output parameters such as clear output, blurry output, no output, combinations thereof, and the like. The one or more security settings may be associated with the one or more regions. For example, a first security setting of the one or more security settings may be associated with a first region of the one or more regions. For example, a second security setting may be associated with a second region of the one or more regions. For example, the one or more output parameters may comprise one or more image processing actions (e.g., sending or not sending data) and/or one or more visual effects such as masking, blurring or otherwise altering the output of the image data. The one or more output parameters may be determined based on the one or more regions and/or the one or more boundaries.

At 1140 image data associated with the object and the first region of the field of view may be sent. For example, the image data may be sent from a computing device to an output device. The image data may be sent based on the one or more output parameters and/or one or more security settings.

At 1150 image data associated with the second region in the field of view may be withheld (e.g., not sent to the output device). As such, a view would not see the second region output on the output device. The image data may be withheld based on the one or more output parameters and/or one or more security settings.

A recognized object may be determined. For example, the recognized object may be determined based on object detection, object recognition, facial detection, and/or facial recognition. A security event may be determined. For example, the security event may be determined based on the recognized object.

Figure 12:
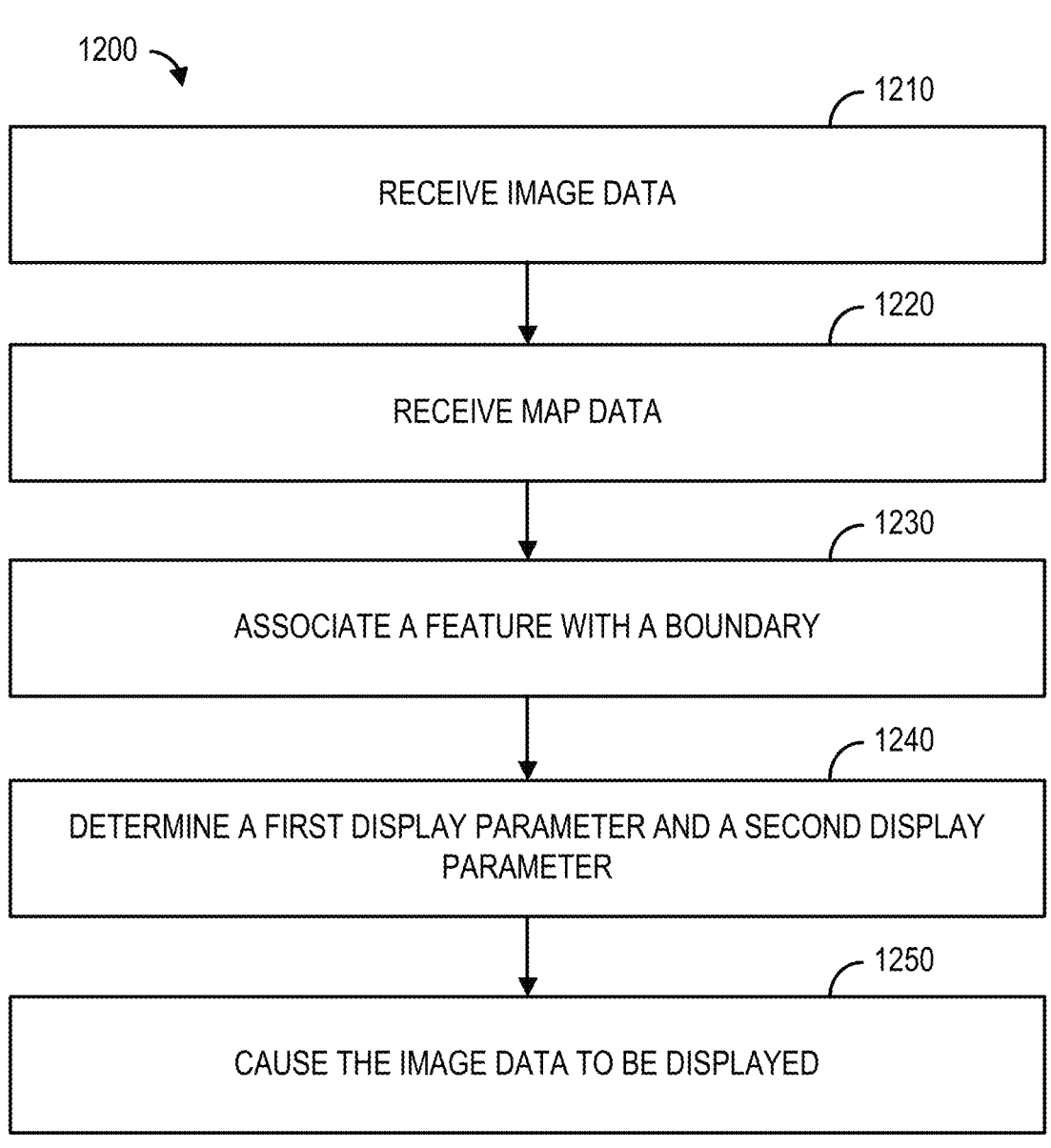
FIG. 12 shows a flowchart of an example method.

FIG. 12 is a flowchart of an example method 1200. The method 1200 may be carried out on any one or more devices. For example, the method 1200 may be carried out on any one or more devices described herein such as those in FIG.

1. At 1210, image data comprising an object and one or more features may be received. The object may be any object such as a person, animal, or any other object. The image data may comprise one or more objects in a field of view of an image capture device. For example, the image capture device may comprise, a camera. The camera may be a component of a security system or some other system configured to capture, send, receive, and process image data. For example, the camera system may capture video of a scene within its field of view (e.g., field of view of the camera, etc.). The image data may comprise a video feed captured by the image capture device and wherein the one or more boundaries comprise a property boundary.

At 1220 map data may be received. The map data may comprise one or more regions and one or more boundaries. For example, a boundary of the one or more boundaries may separate a first region of the one or more regions and a second region of the one or more regions. The map data may comprise GPS data (e.g., GPS coordinates) associated with one or more boundaries, one or more objects, one or more geographical (e.g., topological, geological, etc.) features, and/or relational distances therebetween. For example, the map data may indicate a boundary between a first property and a second property comprises one or more line segments between one or more GPS points (e.g., $lat_x$, $lon_x$ and $lat_y$, $lon_y$).

At 1230 a feature of the one or more features may be associated with a boundary of the one or more boundaries. For example, the feature may comprise a fence or some other object that divides one or more regions. For example, the image capture device may determine a distance to the one or more features based on sensor data received from one or more sensors (e.g., a distance sensor such as SONAR, RADAR, LIDAR, time of flight, combinations thereof, or the like).

At 1240 one or more output parameters may be determined. For example, a first output parameter associated with the first region and a second output parameter associated with the second region may be determined. The one or more output parameters may be associated with the one or more regions in the field of view. The one or more output parameters may be associated with the one or more labels. For example the one or more output parameters may comprise one or more output parameters. For example, a first output parameter and a second output parameter may be determined. For example, the first output parameter may be associated with the first region and the second output parameter may be associated with the second region. The one or more output parameters may be configured to alter the output of image data associated with the one or more regions. For example, the one or more output parameters may comprise one or more image processing actions (e.g., sending or not sending data) and/or one or more visual effects such as masking, blurring or otherwise altering the display of the image data. The one or more output parameters may be determined based on the one or more regions and/or the one or more boundaries.

At 1250 an output device may be caused to output the image data. The image data may be output according to the first output parameter and the second output parameter.

A recognized object may be determined. For example, the recognized object may be determined based on object detection, object recognition, facial detection, and/or facial recognition. A security event may be determined. For example, the security event may be determined based on the recognized object.

Figure 13:
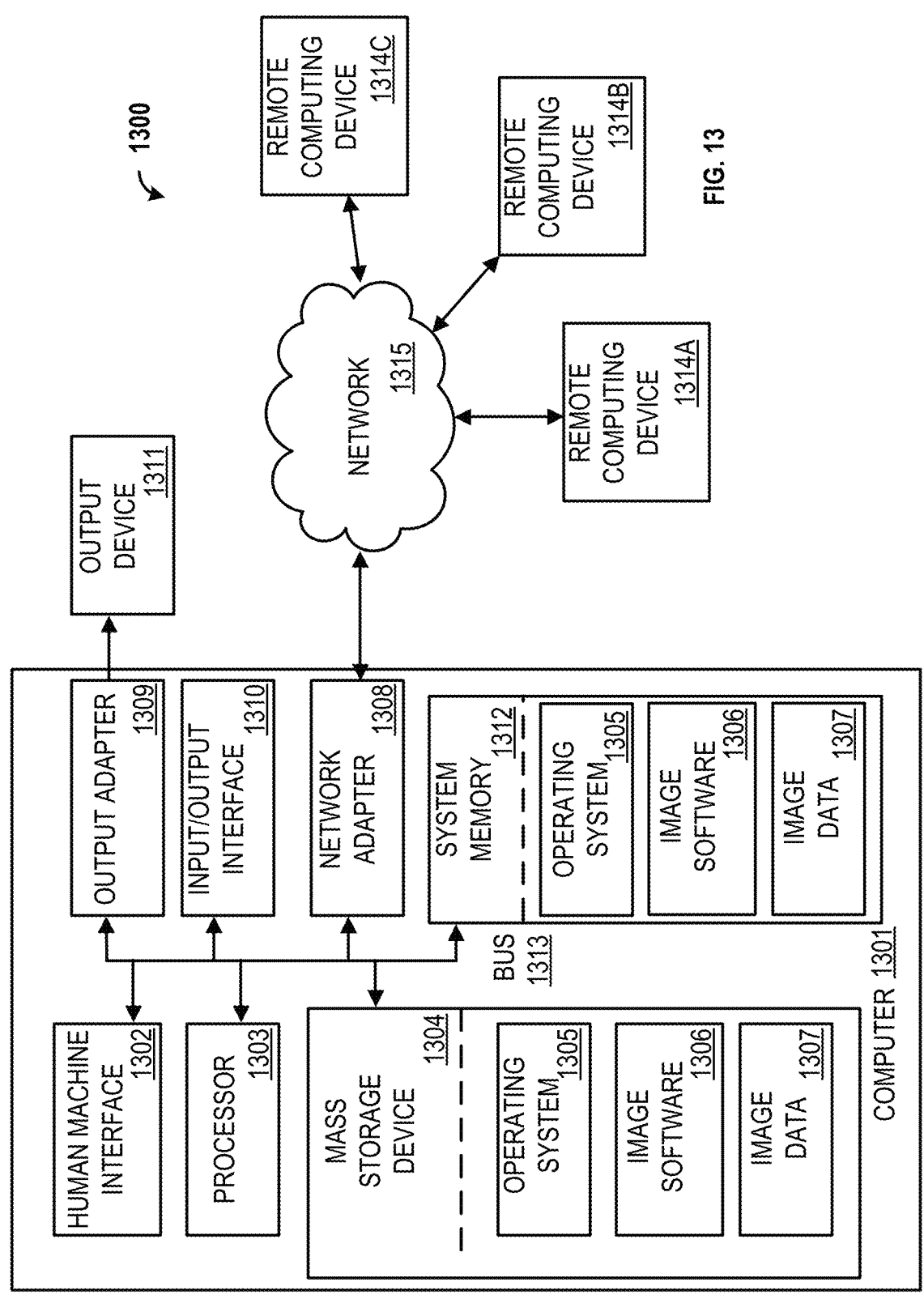
FIG. 13 shows an example system.

The methods and systems may be implemented on a computer 1301 as shown in FIG. 13 and described below. The image capture device 102 and the computing device 104 of FIG. 1 may be a computer 1301 as shown in FIG. 13. Similarly, the methods and systems described may utilize one or more computers to perform one or more functions in one or more locations. FIG. 13 is a block diagram of an operating environment for performing the present methods. This operating environment is a single configuration of many possible configurations of an operating environment, and it is not intended to suggest any limitation as to the scope of use or functionality of operating environment architecture. Neither should the operating environment be interpreted as having any dependency or requirement relating to any one or combination of components shown in the operating environment.

The present methods and systems may be operational with numerous other general purpose or special purpose computing system environments or configurations. Well-known computing systems, environments, and/or configurations that may be suitable for use with the systems and methods may be, but are not limited to, personal computers, server computers, laptop devices, and multiprocessor systems. Additional computing systems, environments, and/or configurations are set top boxes, programmable consumer electronics, network PCs, minicomputers, mainframe computers, distributed computing environments that are composed of any of the above systems or devices, and the like.

The processing of the present methods and systems may be performed by software components. The described systems and methods may be described in the general context of computer-executable instructions, such as program modules, being executed by one or more computers or other devices. Generally, program modules are composed of computer code, routines, programs, objects, components, data structures, etc. that perform particular tasks or implement particular abstract data types. The described methods may also be practiced in grid-based and distributed computing environments where tasks are performed by remote processing devices that are linked through a communications network. In a distributed computing environment, program modules may be located in both local and remote computer storage media including memory storage devices.

Further, one skilled in the art will appreciate that the systems and methods described herein may be implemented via a general-purpose computing device in the form of a computer 1301. The components of the computer 1301 may be, but are not limited to, one or more processors 1303, a system memory 1312, and a system bus 1313 that couples various system components including the one or more processors 1303 to the system memory 1312. The system may utilize parallel computing.

The system bus 1313 represents one or more of several possible types of bus structures, including a memory bus or memory controller, a peripheral bus, an accelerated graphics port, or local bus using any of a variety of bus architectures. Such architectures may be an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 1313, and all buses specified in this description may also be implemented over a wired or wireless network connection and each of the subsystems, including the one or more processors 1303, a mass storage device 1304, an operating system 1305, object identification and action determination software 1306, image data 1307, a network adapter 1308, the system memory 1312, an Input/Output Interface 1310, a display adapter 1309, a display device 1311, and a human machine interface 1302, may be contained within one or more remote computing devices 1314A,B,C at physically separate locations, connected through buses of this form, in effect implementing a fully distributed system.

The computer 1301 is typically composed of a variety of computer readable media. Readable media may be any available media that is accessible by the computer 1301 and may be both volatile and non-volatile media, removable and non-removable media. The system memory 1312 may be computer readable media in the form of volatile memory, such as random access memory (RAM), and/or non-volatile memory, such as read only memory (ROM). The system memory 1312 is typically composed of data such as the image data 1307 and/or program modules such as the operating system 1305 and the object identification and action determination software 1306 that are immediately accessible to and/or are presently operated on by the one or more processors 1303.

The computer 1301 may also be composed of other removable/non-removable, volatile/non-volatile computer storage media. FIG. 13 shows a mass storage device 1304, which may provide non-volatile storage of computer code, computer readable instructions, data structures, program modules, and other data for the computer 1301. The mass storage device 1304 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules may be stored on the mass storage device 1304, such as the operating system 1305 and the object identification and action determination software 1306. Each of the operating system 1305 and the object identification and action determination software 1306 (or some combination thereof) may be elements of the programming and the object identification and action determination software 1306. The image data 1307 may also be stored on the mass storage device 1304. The image data 1307 may be stored in any of one or more databases known in the art. Such databases are DB2®, Microsoft® Access, Microsoft® SQL Server, Oracle®, MySQL, PostgreSQL, and the like. The databases may be centralized or distributed across multiple systems.

The user may enter commands and information into the computer 1301 via an input device (not shown). Such input devices may be, but are not limited to, a keyboard, pointing device (e.g., a "mouse"), a microphone, a joystick, a scanner, tactile input devices such as gloves, and other body coverings, and the like These and other input devices may be connected to the one or more processors 1303 via the human machine interface 1302 that is coupled to the system bus 1313, but may be connected by other interface and bus structures, such as a parallel port, game port, an IEEE 1394 Port (also known as a Firewire port), a serial port, or a universal serial bus (USB).

The output device 1311 may also be connected to the system bus 1313 via an interface, such as the output adapter 1309. It is contemplated that the computer 1301 may have more than one output adapter 1309 and the computer 1301 may have more than one output device 1311. The output device 1311 may be a monitor, an LCD (Liquid Crystal Display), or a projector. In addition to the output device 1311, other output peripheral devices may be components such as speakers (not shown) and a printer (not shown) which may be connected to the computer 1301 via the Input/Output Interface 1310. Any step and/or result of the methods may be output in any form to an output device. Such output may be any form of visual representation, including, but not limited to, textual, graphical, animation, audio, tactile, and the like. The output device 1311 and computer 1301 may be part of one device, or separate devices.

The computer 1301 may operate in a networked environment using logical connections to one or more remote computing devices 1314A,B,C. A remote computing device may be a personal computer, portable computer, smartphone, a server, a router, a network computer, a peer device or other common network node, and so on. Logical connections between the computer 1301 and a remote computing device 1314A,B,C may be made via a network 1315, such as a local area network (LAN) and/or a general wide area network (WAN). Such network connections may be through the network adapter 1308. The network adapter 1308 may be implemented in both wired and wireless environments. Such networking environments are conventional and commonplace in dwellings, offices, enterprise-wide computer networks, intranets, and the Internet.

Application programs and other executable program components such as the operating system 1305 are shown herein as discrete blocks, although it is recognized that such programs and components reside at various times in different storage components of the computing device 1301, and are executed by the one or more processors 1303 of the computer. An implementation of the object identification and action determination software 1306 may be stored on or sent across some form of computer readable media. Any of the described methods may be performed by computer readable instructions embodied on computer readable media. Computer readable media may be any available media that may be accessed by a computer. Computer readable media may be "computer storage media" and "communications media." "Computer storage media" may be composed of volatile and non-volatile, removable and non-removable media implemented in any methods or technology for storage of information such as computer readable instructions, data structures, program modules, or other data. Further, computer storage media may be, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

The methods and systems may employ Artificial Intelligence techniques such as machine learning and iterative learning. Such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; and the number or type of configurations described in the specification.

It will be apparent to those skilled in the art that various modifications and variations may be made without departing from the scope or spirit. Other configurations will be apparent to those skilled in the art from consideration of the specification and practice described herein. It is intended that the specification and methods and systems described therein be considered exemplary only, with a true scope and spirit being indicated by the following claims.

What is claimed is:

1. A method comprising:

receiving, via an image capture device, image data, wherein the image data comprises an object and a plurality of regions;

based on the image data indicating the object overlaps at least two regions of the plurality of regions, determining, based on map boundary data, a plurality of output parameters associated with the plurality of regions, wherein the map boundary data is associated with the image capture device; and causing a device to output the object and the plurality of regions according to the plurality of output parameters.

2. The method of claim 1, wherein the image capture device comprises a camera and wherein the image data comprises one or more of still images or video.

3. The method of claim 1, wherein the plurality of regions comprise a plurality of parcels of a map.

4. The method of claim 1, wherein a first output parameter of the plurality of output parameters comprises an obstructed view of a first region of the plurality of regions and wherein a second output parameter of the plurality of output parameters comprises an unobstructed view of a second region of the plurality of regions.

5. The method of claim 1, further comprising:

determining, based on the object, a security event; and determining, based on the map boundary data, one or more image capture restrictions.

6. The method of claim 1, further comprising determining, based on the image data, a plurality of physical property boundaries between the plurality of regions.

7. The method of claim 1, further comprising applying a plurality of semantic labels to the object and the plurality of regions.

8. A method comprising:

capturing, by an image capture device, image data comprising an object and a plurality of regions;

based on the image data indicating the object overlaps a first region and a second region of the plurality of regions, determining, based on map boundary data, a plurality of security settings associated with the plurality of regions, wherein the map boundary data is associated with the plurality of regions;

sending, based on the plurality of security settings, image data associated with the object and image data associated with the first region; and withholding, based on the plurality of security settings, image data associated with the second region.

9. The method of claim 8, wherein the image data comprises one or more of: a video feed or one or more still images captured by the image capture device.

10. The method of claim 8, wherein the first region is associated with the image capture device.

11. The method of claim 8, further comprising:

determining, based on the map boundary data, a plurality of map boundaries, wherein the plurality of map boundaries comprise one or more of: one or more real property boundaries, one or more physical property boundaries or one or more non-physical property boundaries; and applying, to the object and the plurality of regions, based on the plurality of map boundaries, a plurality of semantic labels.

12. The method of claim 8, further comprising:

obscuring the image data associated with the second region; and sending the image data associated with the second region.

13. The method of claim 8, further comprising:

determining the object is a recognized object;

based on the object being a recognized object, determining a first security setting of the plurality of security settings, wherein the first security setting is associated with the object; and causing, based on the first security setting, the object to be output according to the first security setting.

14. The method of claim 8, further comprising sending, to an output device, based on the plurality of security settings, a message comprising a security alert.

15. A method comprising:

receiving image data comprising an object and a plurality of features;

based on the image data indicating the object overlaps a first map region of a plurality of map regions and a second map region of the plurality of map regions, associating a feature of the plurality of features with a map boundary, wherein the map boundary is associated with the plurality of map regions;

determining, based on the map boundary, a first output parameter associated with the first map region and a second output parameter associated with the second map region; and causing a device to output the image data according to the first output parameter and the second output parameter.

16. The method of claim 15, wherein the image data comprises one or more of: a video feed captured by an image capture device or one or more still images captured by the image capture device and wherein the map boundary comprises a set of GPS coordinates.

17. The method of claim 15, wherein the first map region is associated with a user's property and wherein the second map region is associated with a non-user's property.

18. The method of claim 15, further comprising applying, to the object and the plurality of map regions, a plurality of semantic labels.

19. The method of claim 15, further comprising withholding image data associated with one or more of: the first map region or the second map region.

20. The method of claim 15, further comprising:

determining the object is a recognized object;

based on the object being a recognized object, determining a third security setting associated with the object; and causing, based on the third security setting, the object to be output according to the third security setting.

* * * * *